June 7, 1960   J. A. ORR, SR   2,939,262
LAWN EDGER
Filed Jan. 14, 1958
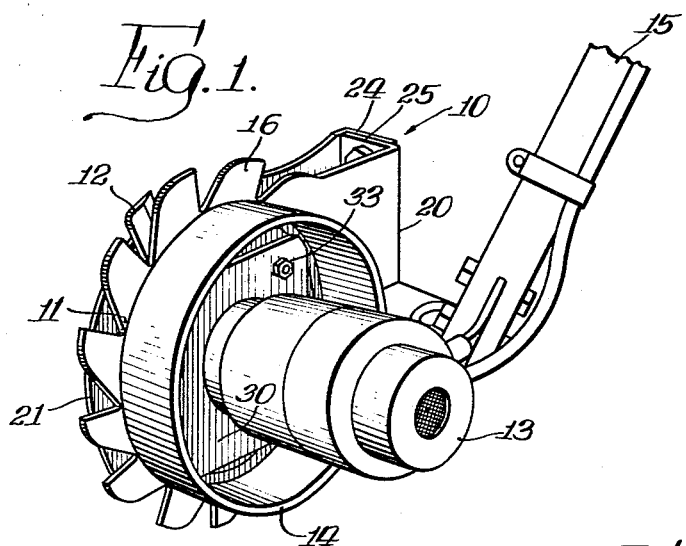
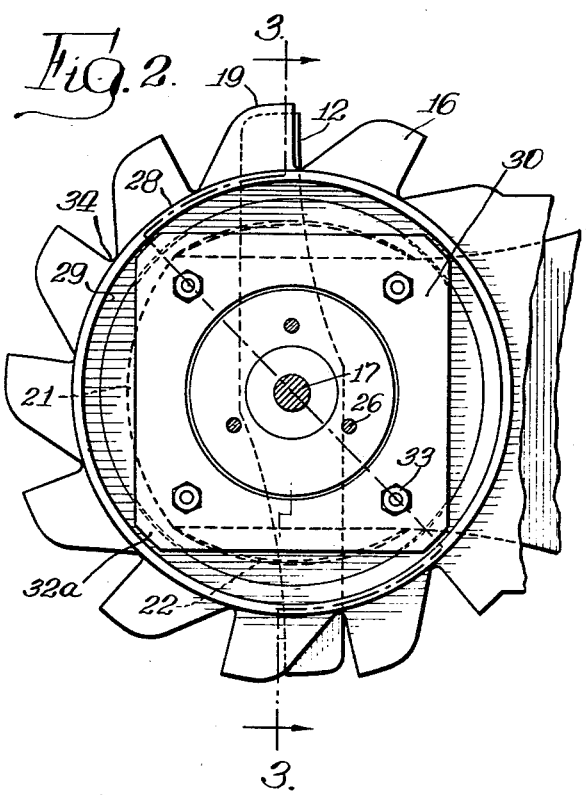
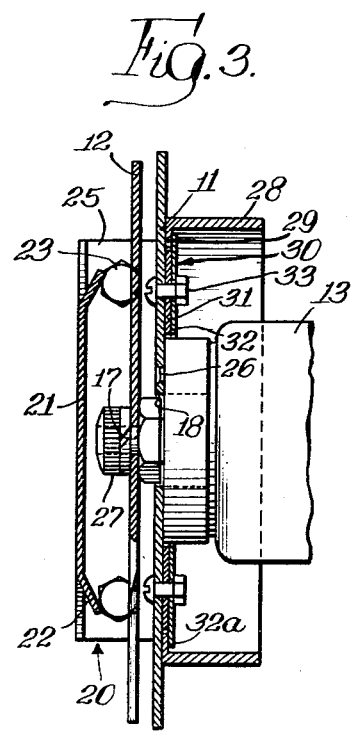
INVENTOR.
John A. Orr, Sr.

United States Patent Office 2,939,262
Patented June 7, 1960

2,939,262
LAWN EDGER

John A. Orr, Sr., 10019 S. Western Ave., Chicago 43, Ill.

Filed Jan. 14, 1958, Ser. No. 708,786

3 Claims. (Cl. 56—25.4)

This invention relates to edging means for use in landscaping and in particular to a lawn trimmer.

Means for edging landscape portions, such as lawns, adjacent other landscape portions, such as sidewalks or driveways, are well-known. However, the presently known edging means have several serious disadvantages, one such disadvantage being difficulty in moving the edging means over the walk or driveway while maintaining an accurate depth of trimming action on the adjacent landscape portion. Known devices utilize sliding shoe members or small diameter wheels, and, in addition to the difficulty of moving such shoes and wheels over irregular surfaces, a variation in the depth of edging action occurs therewith whenever the edging means is pivoted in a vertical plane about the shoe or wheels.

The principal object of this invention is to provide a new and improved edging means.

Another object is to provide such an edging means having a base plate having peripheral cutting teeth, a large diameter annular member rotatably mounted on the base plate, and a cutting blade rotatable coaxially of the annular member, whereby the annular member may roll over one portion of the landscape, such as the walk or driveway, and at all times maintain the cutting means comprising said teeth and blade at the proper depth relative to the adjacent landscape portion, such as a lawn.

A further object is to provide such an edging means wherein the annular member has a radius substantially equal to the outside diameter of the cutting means less the desired depth of insertion of the cutting means into the portion of the landscape to be edged.

Still another object is to provide such an edging means wherein the annular member is retained rotatably coaxially of the cutting means by new and improved retaining plate means.

A still further object is to provide such an edging means wherein the retaining plate means has a low friction engagement with the coacting portion of the annular member.

Other features and advantages of this invention will be apparent from the following description taken in connection with the accompanying drawings wherein:

Fig. 1 is an isometric view of an edging means embodying the invention, the handle thereof being shown fragmentarily;

Fig. 2 is an enlarged, fragmentary side elevation thereof; and

Fig. 3 is a fragmentary, generally diametric section thereof taken approximately along the line 3—3 of Fig. 2.

In the exemplary embodiment of the invention, as disclosed in the drawings, an edging means or trimmer generally designated 10 is shown to comprise a base plate 11, cutting blade means 12 rotatably associated with plate 11, drive means 13 fixedly mounted on plate 11 to drive blade means 12, a large diameter, annular depth gauge member 14 rotatably mounted on plate 11 coaxially of the blade means 12 and drive means 13, and a handle means 15 pivotally connected to plate 11 to effect movement of the edging means 10 by the user as desired.

More specifically, plate 11 comprises a generally circular member having a plurality of fixed, outwardly extending projections or teeth 16. Teeth 16 are arranged to be inserted into a lawn edge adjacent a walk or driveway to assist blade means 12 in cutting a groove in the lawn edge. The knife-like blade means 12 is centrally mounted on a shaft means 17 extending from one end of the drive means 13 through an opening 18 in plate 11, whereby blade means 12 is rotatably associated with the plate for cutting movement in a plane juxtaposed parallel to the plate. The radial extent of blade means 12 from shaft means 17 is preferably just slightly less than the radial spacing of the outer tip 19 of teeth 16 from the shaft means. To permit the use of edging means 10 in the manner of a rotary mower, a bracket 20 extends from plate 11 to have a slide plate 21 spaced parallel to plate 11 with blade means 12 disposed therebetween. As best seen in Fig. 3, slide plate 21 may be provided with upturned edge portions 22 to facilitate movement of the edging means over the landscape portion being mowed. In the illustrated embodiment, slide plate 21 is secured to plate 11 by suitable bolt means 23 associated with a right angularly extending flange 24 on slide plate 21 and a right angularly extending flange 25 on bracket 20, the latter in the illustrated embodiment being integral with plate 11.

Drive means 13 comprises an electrical motor fixedly secured at one end to plate 11 by means such as screws 26. Shaft means 17, as described above, serves to connect blade means 12 to the motor. To permit replacement of blade means 12 when desired, shaft means 17 is provided with a removable retaining nut 27 which, when removed, permits the removal or installation of blade means 12 relative to the shaft means 17. For improved operation of edging means 10, it is preferred that motor means 13 be provided with large brushes and have a specially balanced armature to prevent undesirable vibration.

As briefly alluded to above, means are provided in edging means 10 for automatically gauging the depth of insertion of projections 16 into the landscape portion being edged while permitting free movement of the edging means over the adjacent portion of the landscape. More specifically, the depth gauging means comprises annular member 14 which includes a large diameter tubular portion 28 and a radially inwardly extending annular flange 29 at the inner end thereof. Flange 29 is retained in slidable facial engagement with plate 11, for rotation of annular member 14 coaxially of shaft means 17, by means of an annular retaining plate means 30. Retaining plate means 30 includes a longitudinally inner portion 31 facially engaging plate 11 and having an outside diameter substantially equal to the inside diameter of flange 29 and a thickness substantially equal to the thickness of flange 29. Longitudinally outwardly of inner portion 31, retaining plate 30 is provided with an outer portion 32 having an outside diameter substantially larger than the inside diameter of flange 29 so as to extend laterally outwardly and overlie said flange, thereby preventing movement of the annular member longitudinally away from plate 11. As shown, the inner and outer portions 31 and 32 of retaining plate means 30 may, if desired, comprise separate elements. The retaining plate means 30 is secured fixedly to plate 11 by suitable securing means, such as bolt means 33, which may also serve to retain the inner and outer portions 31 and 32 in assembled relationship.

As best seen in Fig. 2, outer portion 32 of retaining plate 30 overlies flange 29 discontinuously. More specifically, portion 32 may be generally square-shaped having rounded corners 32a comprising the portions thereof overlying flange 29. The reduced frictional engagement of outer portion 32 with flange 29 resulting from the limited engagement permits ease of rotation of annular member 14 and facilitates the maintenance of the edging means.

As best seen in Fig. 2, the radius of annular member 14 is comparable to the spacing of the inner end 34 of projections 16 from the axis of plate 11. Thus, when the radially outer surface of tubular portion 28 is disposed in engagement with one portion of the landscape, such as a walk or driveway (not shown), the insertion of plate 11 into the adjacent portion of the landscape, such as a lawn (not shown) is limited to an insertion of teeth 16 fully thereinto and the depth of cutting action by teeth 16 and blade 12 is limited to the desired proper depth. It should be noted that this automatic gauging of the depth of the edging is effected in edging means 10 notwithstanding movement of plate 11 about its axis (such as a counterclockwise rotation of plate 11 as seen in Fig. 2). Thus, notwithstanding the fact that different operators may arrange handle means 15 at different inclinations to the horizontal during use of the edging means, annular member 14 assures the desired depth of insertion of the cutting means.

To utilize means 10 in an edging operation, the handle 15 is grasped by the operator to position a plate 11 in a plane extending vertically at the edge of the landscape portion, such as a lawn, being edged. The annular member is arranged to rest on and roll over the adjacent landscape portion such as a walk with teeth 16 inserted into the lawn edge. Motor 13 is energized to effect a high speed rotation of blade 12. The edging means 10 is then moved along the edge of the lawn with the annular member rolling over the walk whereby the blade 12, in conjunction with teeth 16, cuts a groove in the lawn edge thereby effecting the desired edging of the lawn. As all portions of the annular member are equidistant from the axis of blade 12, the depth of insertion of teeth 16 and the tip of blade 12 into the lawn edge is constant, notwithstanding any variation in the angular disposition of handle 15.

While I have shown and described certain embodiments of my invention, it is to be understood that it is capable of many modifications. Changes, therefore, in the construction and arrangement may be made without departing from the spirit and scope of the invention as defined in the appended claims.

I claim:

1. Edging means for use in landscaping, comprising: a generally circular plate having a plurality of peripheral, outwardly extending projections; a drive means having a fixed portion secured to said plate and a rotative shaft extending through said plate to terminate in an outer end; blade means secured to the shaft end for cutting movement in a plane juxtaposed parallel to said plate; an annular member having a tubular portion and a radially inwardly extending annular flange at one end of the tubular portion, the outer radius of said tubular portion being substantially equal to the radius of said plate as measured to the inner ends of the projections; and an annular retaining plate coaxially, rotatably mounting said annular member on said circular plate oppositely of said blade means, said retaining plate being provided with an inner portion fixedly secured to the circular plate and having a diameter substantially equal to the inside diameter of said flange and a thickness substantially equal to the thickness of said flange, and an outer portion extending laterally outwardly to overlie said flange and prevent movement thereof away from said plate.

2. The edging means of claim 1 wherein the outer portion of the retaining plate extends laterally outwardly only at spaced intervals.

3. The edging means of claim 1 wherein the inner and outer portions of the retaining plate comprise separate members.

References Cited in the file of this patent

UNITED STATES PATENTS

| | | |
|---|---|---|
| 2,052,234 | Laddon et al. | Aug. 25, 1936 |
| 2,479,460 | Becker | Aug. 16, 1949 |
| 2,496,327 | Beck | Feb. 7, 1950 |
| 2,782,584 | Lokey | Feb. 26, 1957 |
| 2,795,095 | Kaufman | June 11, 1957 |